United States Patent
Hortman, III

(10) Patent No.: US 11,618,319 B2
(45) Date of Patent: Apr. 4, 2023

(54) ADJUSTABLE PEDAL BLOCK

(71) Applicant: Lewis Clark Hortman, III, Reynolds, GA (US)

(72) Inventor: Lewis Clark Hortman, III, Reynolds, GA (US)

( * ) Notice: Subject to any disclaimer, the term of this patent is extended or adjusted under 35 U.S.C. 154(b) by 168 days.

(21) Appl. No.: 17/342,500

(22) Filed: Jun. 8, 2021

(65) Prior Publication Data

US 2021/0379989 A1 Dec. 9, 2021

Related U.S. Application Data

(60) Provisional application No. 63/035,948, filed on Jun. 8, 2020.

(51) Int. Cl.
*B60K 26/02* (2006.01)
*G05G 5/04* (2006.01)
*G05G 1/48* (2008.04)

(52) U.S. Cl.
CPC ............ *B60K 26/02* (2013.01); *G05G 1/48* (2013.01); *G05G 5/04* (2013.01); *B60K 2026/026* (2013.01)

(58) Field of Classification Search
CPC ............ G05G 1/48; G05G 1/487; G05G 5/04; G05G 1/30; G05G 1/405; B60K 2026/026; B60K 26/02; B60T 7/06
See application file for complete search history.

(56) References Cited

U.S. PATENT DOCUMENTS

| | | | |
|---|---|---|---|
| 2,332,064 A | 10/1943 | Duffy | |
| 2,349,742 A * | 5/1944 | Macavoy | B60K 26/02 74/526 |
| 2,679,767 A * | 6/1954 | Wasserkrug | B60K 26/02 74/526 |
| 2,824,465 A | 2/1958 | Riley | |
| 3,047,088 A | 7/1962 | Murrell | |
| 3,765,265 A | 10/1973 | Dzus | |

(Continued)

FOREIGN PATENT DOCUMENTS

| | | | | |
|---|---|---|---|---|
| DE | 202013007204 U1 * | 11/2013 | | B60K 26/02 |
| EP | 1258794 A1 | 11/2002 | | |
| JP | 2002331847 A | 11/2002 | | |

OTHER PUBLICATIONS

RSS Clutch Stop Kit, https://www.stableenergies.com/RSS-Clutch-Stop-Kit-Adjustable/productinfo/RSS-111/.

*Primary Examiner* — Thomas C Diaz

(57) ABSTRACT

An adjustable pedal block is an apparatus that limits the maximum travel speed of a vehicle. The apparatus may also require additional tools to disable the apparatus. The apparatus includes a block body, a pedal-receiving slot, a stopper assembly, and at least one spacer. The block body engages with a pedal and connects the stopper assembly with the pedal. The pedal-receiving slot allows the pedal to traverse into the block body while preserving the structural integrity of the block body. The stopper assembly offsets the pedal from the floor of the vehicle and limits the actuation of the pedal. The at least one spacer tightens the pedal with the block body and secures the position of the pedal within the pedal-receiving slot. The pedal and the at least one spacer are secured within the block body with a left clamp assembly and a right clamp assembly of the apparatus.

20 Claims, 9 Drawing Sheets

(56) References Cited

U.S. PATENT DOCUMENTS

| | | | |
|---|---|---|---|
| 3,918,320 A * | 11/1975 | Glick, Jr | G05G 7/04 74/513 |
| 4,012,965 A * | 3/1977 | Stupak | B60K 26/02 74/513 |
| 4,527,682 A | 7/1985 | Gale | |
| D650,184 S | 12/2011 | Hsu | |
| D657,069 S | 4/2012 | Brazier | |
| D669,351 S | 10/2012 | Au | |
| D690,522 S | 10/2013 | Pontiff | |
| D692,393 S | 10/2013 | Hillman | |
| D695,698 S | 12/2013 | Greenberg | |
| D732,129 S | 6/2015 | Hanscom | |
| D736,867 S | 8/2015 | Glickfield | |
| D810,010 S | 2/2018 | Rook | |
| D839,009 S | 1/2019 | Garbus | |
| D884,566 S | 5/2020 | Hirneise | |
| D911,250 S | 2/2021 | Hortman | |
| 2012/0137824 A1 | 6/2012 | Himanen | |
| 2015/0338873 A1 * | 11/2015 | Pepe | G05G 25/00 74/526 |

* cited by examiner

ADJUSTABLE PEDAL BLOCK

The current application claims a priority to the U.S. Provisional Patent application Ser. No. 63/035,948 filed on Jun. 8, 2020.

FIELD OF THE INVENTION

The present invention generally relates to driving accessories. More specifically, the present invention is an adjustable pedal block.

BACKGROUND OF THE INVENTION

In present times, individuals may utilize a variety of light utility or recreational vehicles as may be understood to fall under the monikers of golf car, utility car, golf trolley, side-by-side, UTV, or other names generally used to refer to self-propelled vehicles smaller than a typical passenger car. These vehicles generally do not require licensure to operate; people who might otherwise never find themselves behind the wheel of a car are given control of these vehicles. Further, these vehicles are known to be operated as part of rental pools to be temporarily loaned to users, who may be unfamiliar with the controls of such vehicles even if they are otherwise capable of operating similar vehicles. It is therefore a known practice to artificially govern the maximum speed or acceleration of these vehicles to disallow misuse or dangerous operations outside of the authorization of the owner or operator. Some methods and means may involve mechanical speed governors fitted to driven axles, current limiting devices introduced to the electrical control systems, modification of existing powerplants to reduce output, or even wholesale replacement of operator controls to achieve a lower potential throttle response. These methods, in addition to being costly to implement, are considered unsuitable for application in circumstances wherein a user does not own the subject vehicle (and is not permitted to make permanent modifications) or instances wherein the user wishes to reverse the limiting effect with a minimum of vehicle down-time. It is also considered an object of a suitable alternative to be cost-effective relative to the means and methods presently available on the market.

The present invention aims to provide a universal attachment capable of non-permanently limiting the maximum travel of a vehicle throttle pedal, such that the maximum speed or acceleration of a vehicle may be restricted. It is further considered that the limitations to the pedal travel may be removed or disabled without disengaging the entire assembly from the host vehicle. Additional configurations may enable the strict limitation of the throttle position via the introduction of tamper-resistant components requiring hand tools to remove, disable, or adjust.

DETAILED DESCRIPTIONS OF THE INVENTION

Figure 1:
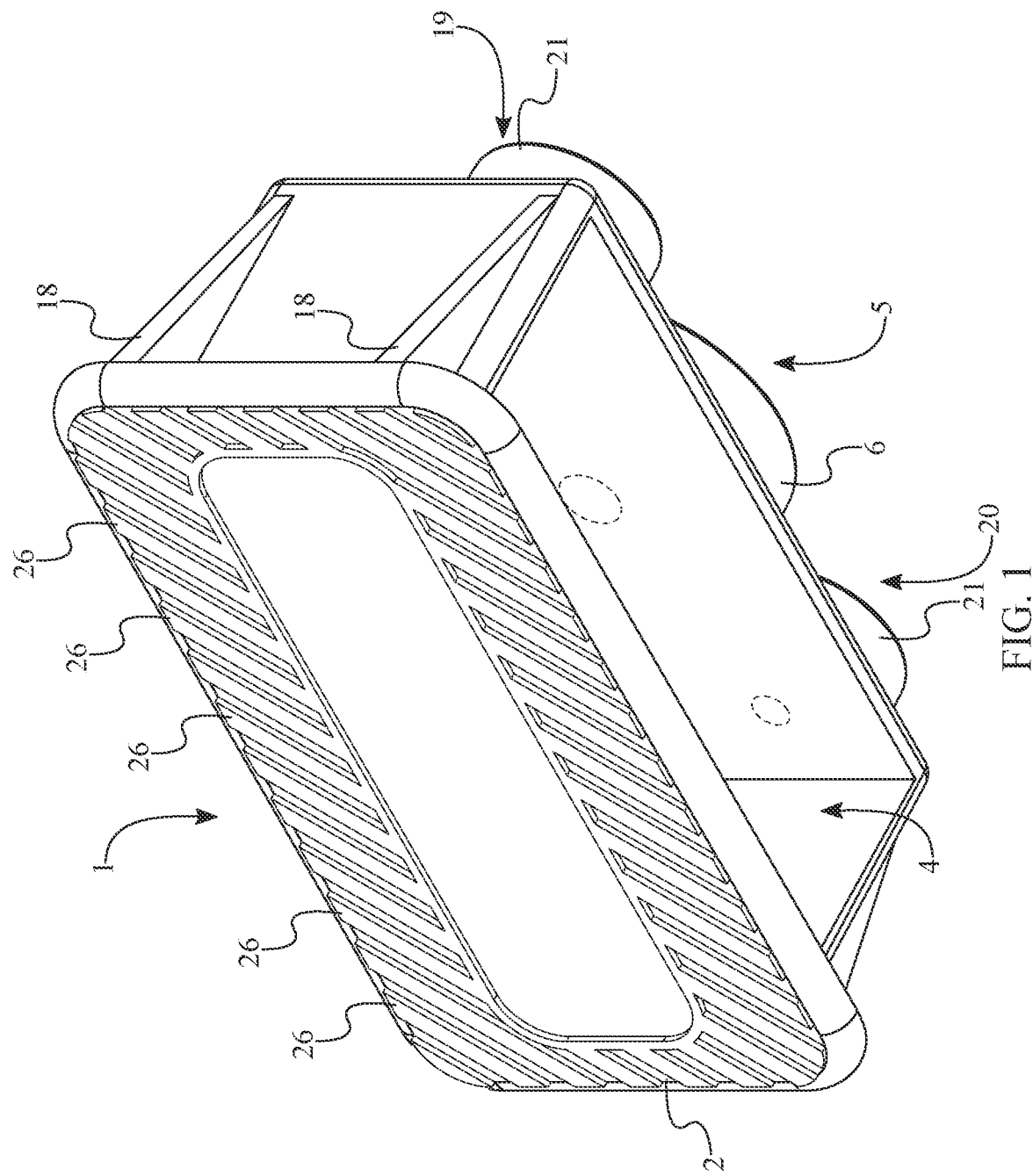
FIG. 1 is a front perspective view of a first embodiment of the present invention.

All illustrations of the drawings are for the purpose of describing selected versions of the present invention and are not intended to limit the scope of the present invention.

The present invention is an adjustable pedal block. The present invention provides a means of limiting the actuation of a pedal to limit the maximum speed of a vehicle. More specifically, the present invention serves as a universal attachment capable of permanently and temporarily limiting the maximum travel speed of a vehicle throttle pedal, such that the maximum speed or acceleration of a vehicle may be restricted. The present invention may be removed or disabled without disengaging the entire unit from the host vehicle. Furthermore, the present invention may also limit access for the removal and adjustment of the throttle position by requiring hand tools to remove, disable, or adjust. The present invention is preferably engaged with an electric golf cart or a similar utility vehicle. The present invention may comprise a block body 1, a pedal-receiving slot 4, a stopper assembly 5, and at least one spacer 12, seen in FIG. 5, FIG. 6, FIG. 7, FIG. 8, and FIG. 9. The block body 1 surrounds a top portion of a pedal and serves as a mount or connection for the stopper assembly 5 with the pedal. Furthermore, the block body 1 may comprise a first flat surface 2 and a second flat surface 3. The first flat surface 2 is oriented towards the foot of a user, and the second flat surface 3 is oriented towards the floor of a vehicle. Moreover, the first flat surface 2 is directly pressed by the foot of the user. In the preferred embodiment of the present invention, a surface area of the first flat surface 2 is greater than a surface of the second flat surface 3. The pedal-receiving slot 4 allows the pedal to traverse into the block body 1 and be positioned within the block body 1 while preserving the structural integrity of the block body 1. The stopper assembly 5 offsets the second surface from the floor of the vehicle while being actuated by the user. The stopper assembly 5 may comprise a stopper plate 6, a stopper bolt 7, a first bolt-receiving slot 8, and a first nut 9. The stopper plate 6 connects the stopper bolt 7 with the block body 1. The stopper bolt 7 defines the distance between pedal and the floor of the vehicle, thereby defining a maximum desired speed for the vehicle. The first bolt-receiving slot 8 allows the stopper bolt 7 to traverse through both the stopper plate 6 and the block body 1 in order for the stopper bolt 7 to press against the at least one spacer 12. The first nut 9 serves as a lock for the stopper bolt 7. More specifically, the stopper bolt 7 is rotationally and linearly mounted through the first bolt-receiving slot 8 with the first nut 9. The at least one spacer 12 tightens and secures the position of the pedal within the pedal-receiving slot 4. The at least one spacer 12 may comprise an indented side 13 and a linear side 17. The indented side 13 allows the stopper bolt 7 to come into contact and directly press against the pedal. The linear side 17 structurally reinforces the at least one spacer 12.

The overall configuration of the aforementioned components allows the present invention to serve as a universal attachment for a foot pedal. In order for a pedal to be positioned within the block body 1, the first flat surface 2 is positioned opposite the second flat surface 3 about the block body 1, seen in FIG. 1, FIG. 2, FIG. 3, and FIG. 4. The block body 1 engages with the pedal as the pedal-receiving slot 4 is positioned in between the first flat surface 2 and the second flat surface 3 and laterally traverses into the block body 1. In order for the at least one spacer 12 to effectively secure the position of the pedal within the pedal-receiving slot 4 while providing a path for the stopper bolt 7, the indented side 13 is positioned opposite the linear side 17 about the at least one spacer 12, and the at least one spacer 12 is positioned into the pedal-receiving slot 4. The stopper plate 6 is fixed onto the second flat surface 3 as the second flat surface 3 is oriented towards the floor of the vehicle. The portion of the stopper bolt 7 within the stopper plate 6 and block body 1 presses directly against the pedal as the first bolt-receiving slot 8 traverses through the stopper plate 6, into the block body 1, and into the pedal-receiving slot 4. The actuation of the pedal is limited as the first nut 9 is threadably engaged with the stopper bolt 7. The stopper bolt 7 is mounted through the first bolt-receiving slot 8, thereby offsetting the pedal from the floor of the vehicle. The stopper bolt 7 has a continuous path within the block body 1 and through the spacer as the indented side 13 is laterally positioned about the stopper bolt 7.

Figure 2:
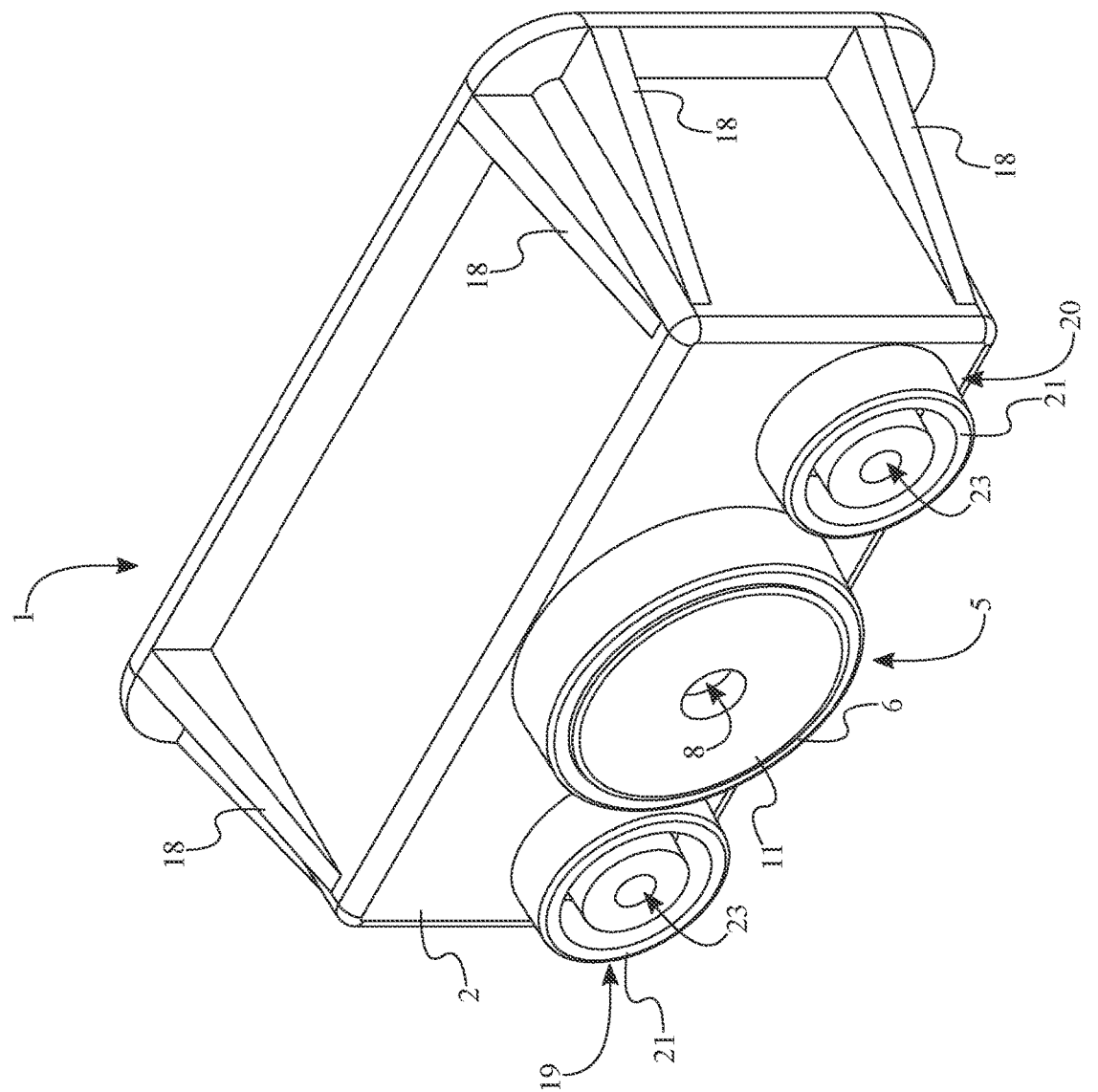
FIG. 2 is a rear perspective view of the first embodiment of the present invention.
Figure 3:
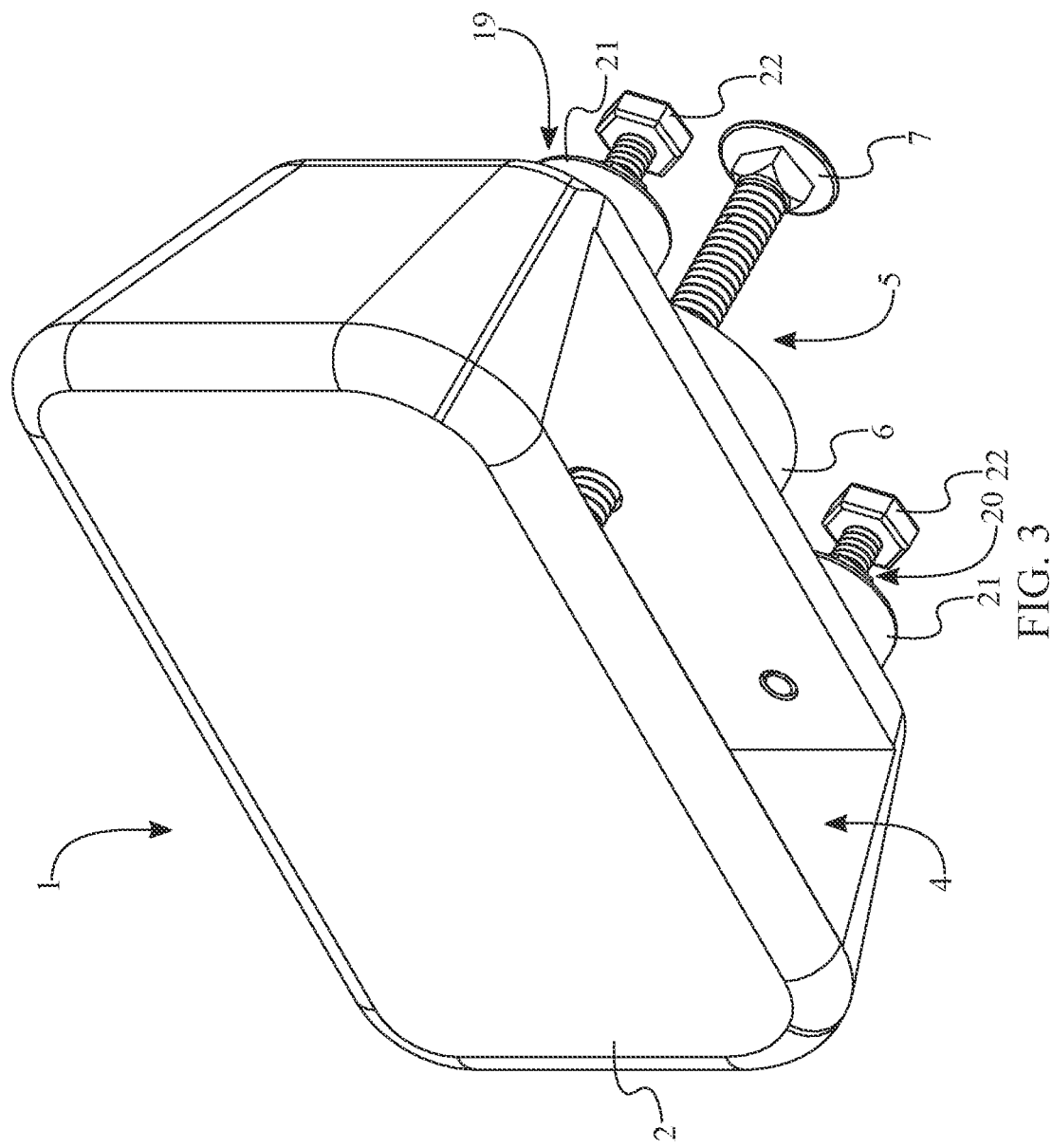
FIG. 3 is a front perspective view of a second embodiment of the present invention.
Figure 4:
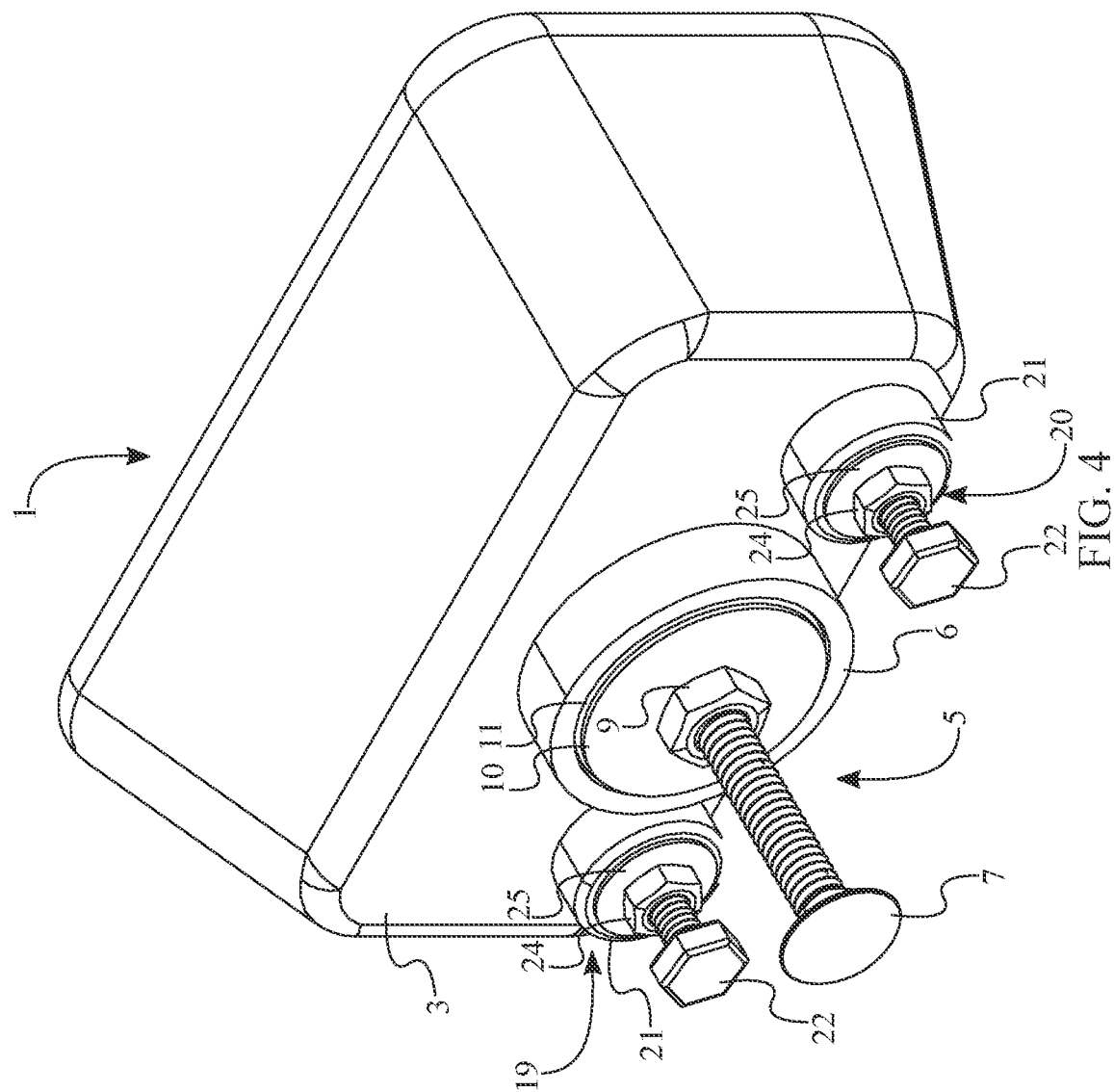
FIG. 4 is a rear perspective view of the second embodiment of the present invention.
Figure 5:
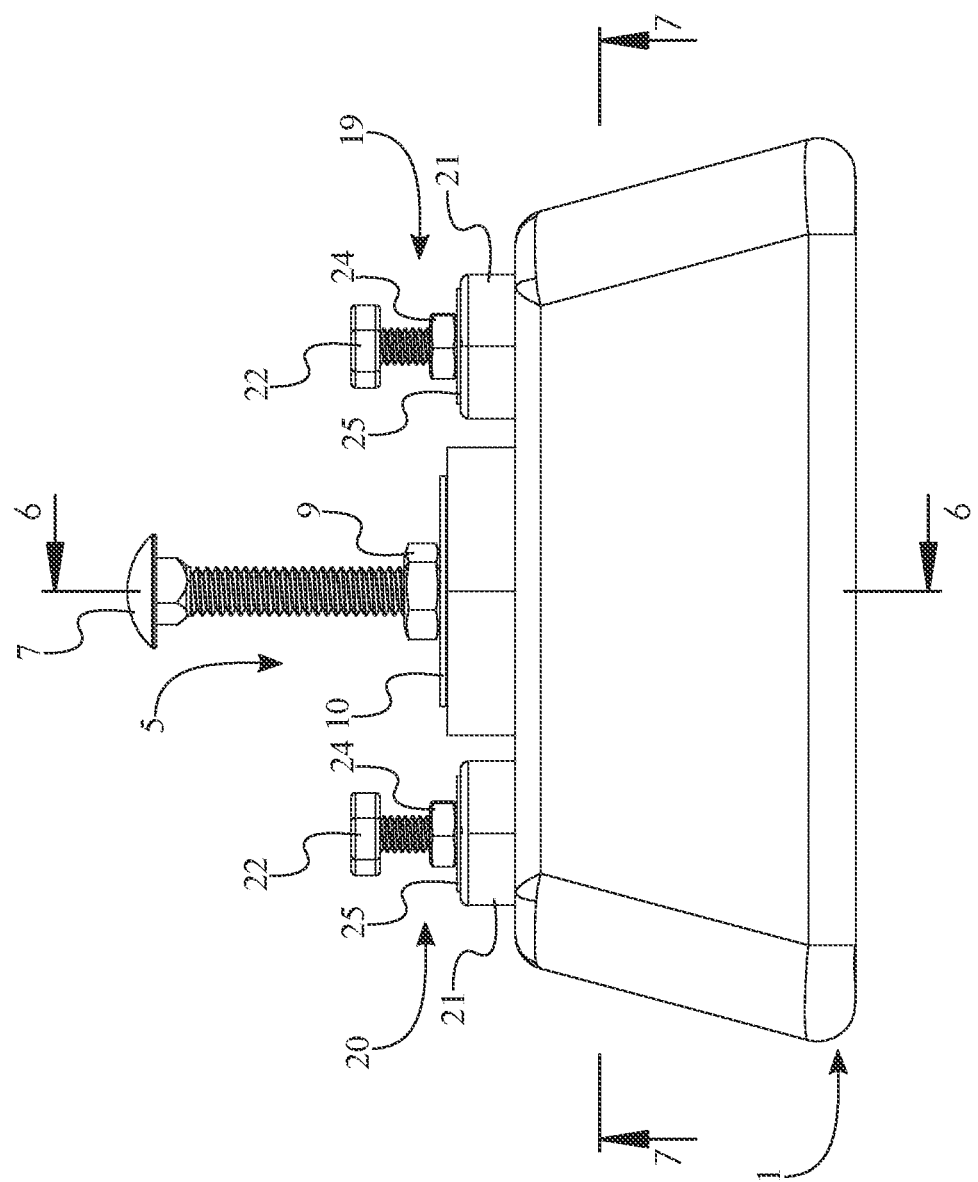
FIG. 5 is a top side view of the second embodiment of the present invention.
Figure 6:
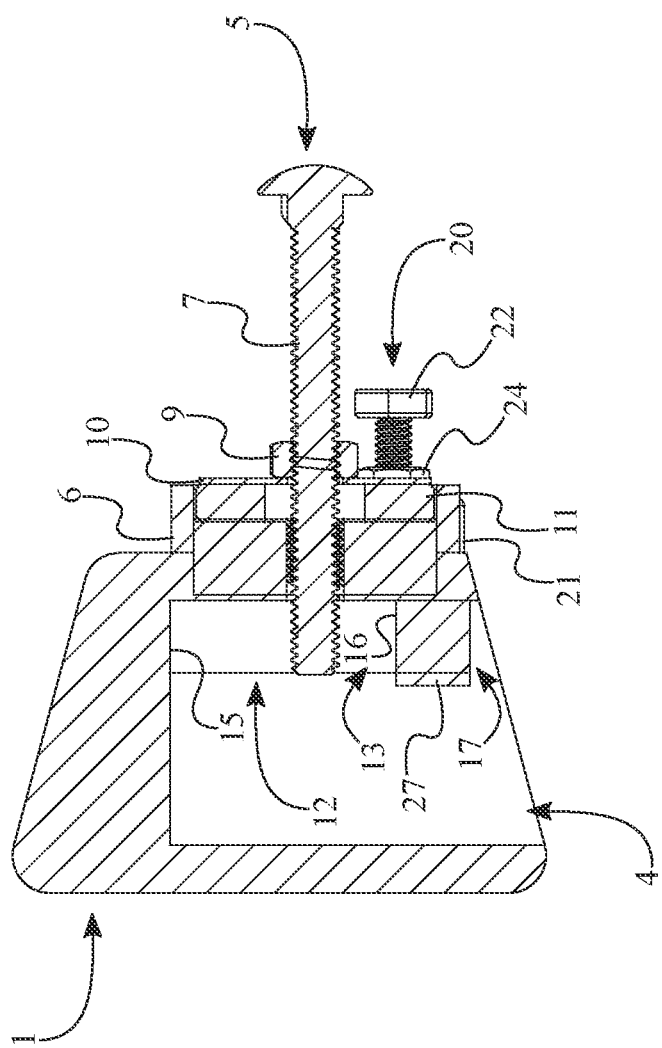
FIG. 6 is a cross-section view taken along line 6-6 in FIG. 5 of the second embodiment of the present invention.
Figure 7:
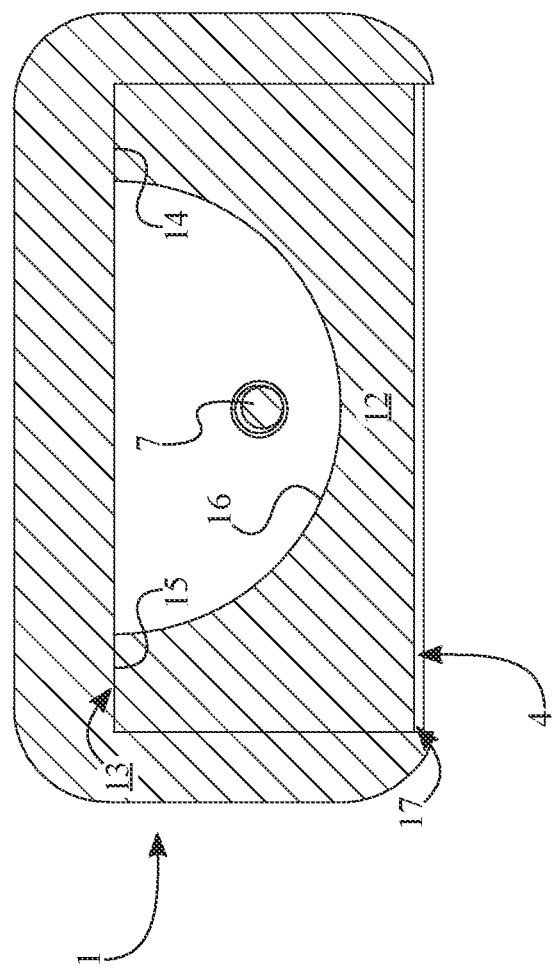
FIG. 7 is a cross-section view taken along line 7-7 in FIG. 5 of the second embodiment of the present invention.
Figure 8:
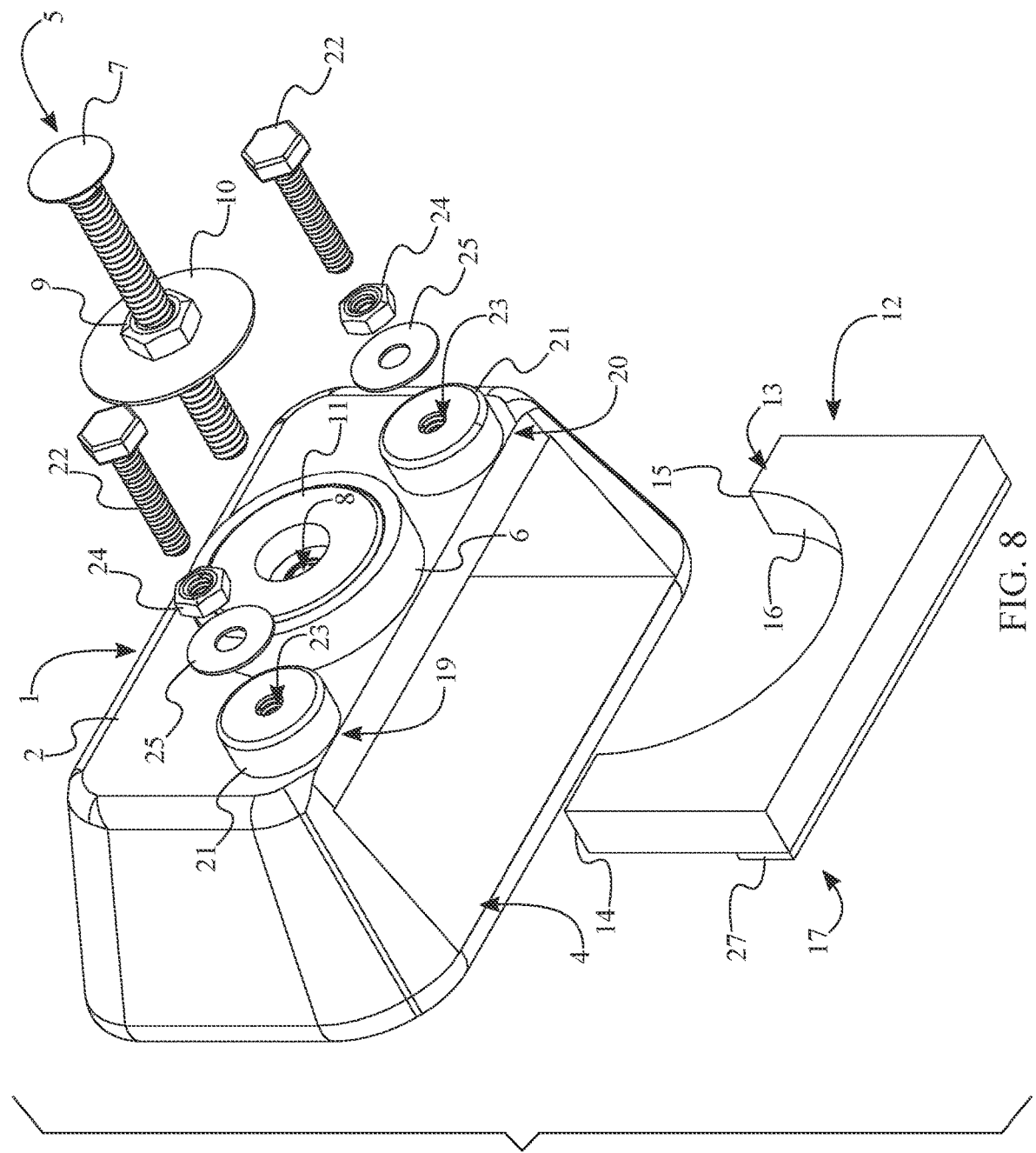
FIG. 8 is a rear exploded view of the second embodiment of the present invention in a lockdown mode.

A first embodiment of the present invention further comprises a plurality of counterforts 18, seen in FIG. 1 and FIG. 2. The plurality of counterforts 18 minimizes the overall size and material of the block body 1 while providing the necessary support and reinforces the structural integrity of the block body 1. In order to maintain the strength of the block body 1, the plurality of counterforts 18 is distributed around the block body 1. The connections of the stopper assembly 5 and the at least one spacer 12 with the pedal are maintained as the plurality of counterforts 18 are externally connected to the block body 1. More specifically, each of the plurality of counterforts 18 taper from the first flat surface 2 to the second flat surface 3, thereby providing an ergonomic structure for the present invention with the pedal.

Similarly for a second embodiment of the present invention, the block body 1 tapers from the first flat surface 2 to the second flat surface 3, seen in FIG. 3, FIG. 4, FIG. 5, FIG. 6, FIG. 8, and FIG. 9. For the second embodiment of the present invention, the plurality of counterforts 18 does not support the block body 1. The tapered construction for the block body 1 of the second embodiment of the present invention also provides an ergonomic structure for the present invention with the pedal.

Figure 9:
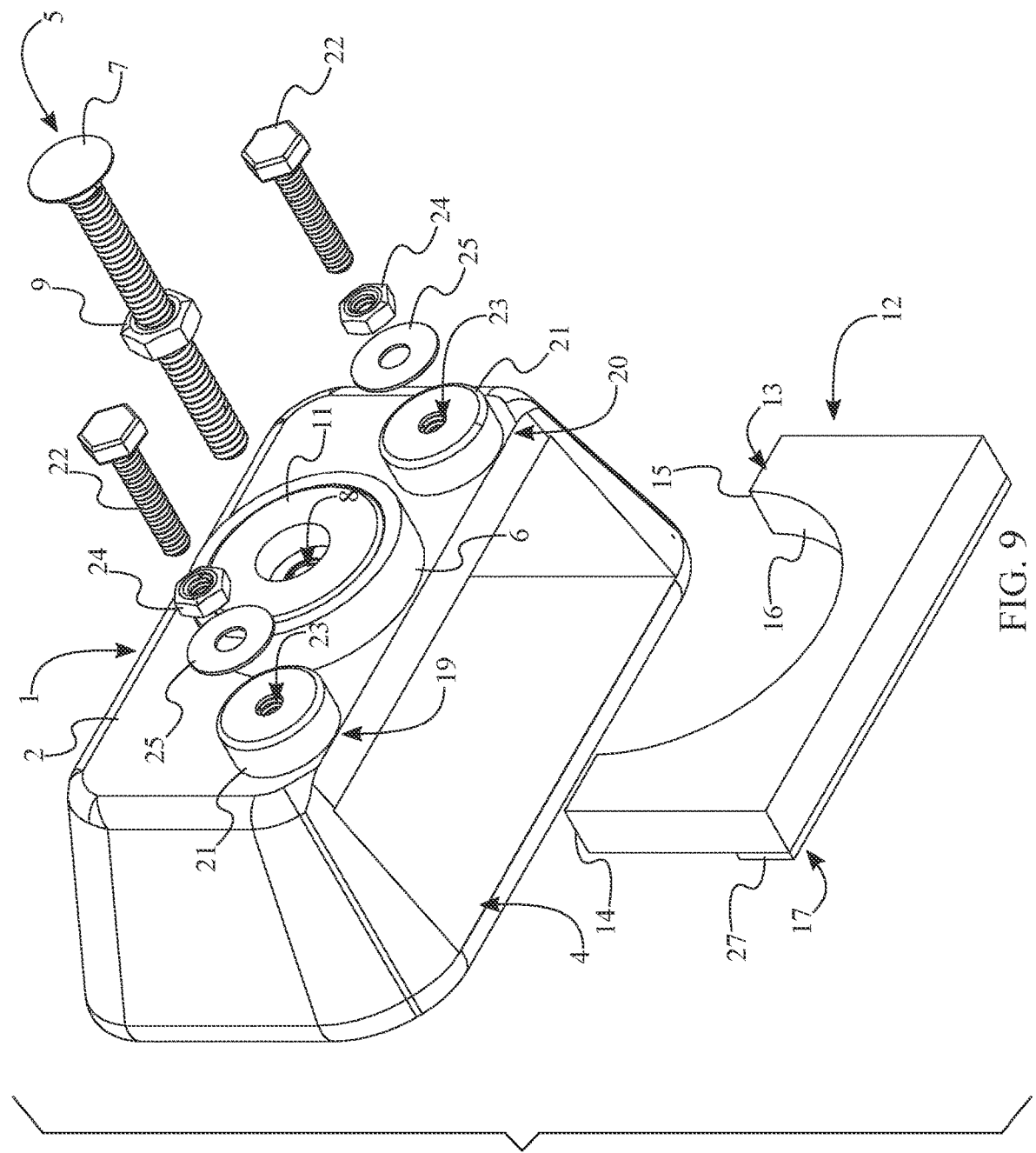
FIG. 9 is a rear exploded view of the second embodiment of the present invention in an 'on-the-fly' mode.

In a lockdown mode for the present invention, seen in FIG. 9, the stopper bolt 7 is threadably engaged with the first bolt-receiving slot 8. This engagement prevents the stopper bolt 7 from being easily removed or adjusted and requires additional tools to remove or adjust. The lockdown mode prevents a user from readily removing the restrictions placed on the pedal of a vehicle with the present invention, for example, a child derestricting a vehicle intentionally handicapped by a parent or guardian. In the lockdown mode, the first nut 9 is tightened onto the stopper plate 6, fixing the rotational and linear position of the stopper bolt 7 with the stopper plate 6.

In a 'on-the-fly' mode for the present invention, seen in FIG. 4, FIG. 5, FIG. 6, and FIG. 8, the stopper assembly 5 may further comprise a first washer 10 and a magnetic annular disk 11. The 'on-the-fly' mode permits the ready removal of the stopper bolt 7 without any tools, enabling the user to quickly restore a vehicle to full operational capacity without the removal of the block body 1 from the pedal. The first washer 10 allows the stopper bolt 7 to easily be connected and disconnected to the stopper plate 6 with the magnetic annular disk 11. In order to connect the first washer 10 with the stopper bolt 7, the first nut 9 is fixed onto the first washer 10, and the stopper bolt 7 is positioned through the first washer 10. More specifically, the first washer 10 is slidably engaged along the stopper bolt 7, allowing the first nut 9 to be easily adjusted along the stopper bolt 7. The first washer 10 connects with the stopper plate 6 as the magnetic annular disk 11 is integrated into the stopper plate 6. A secure connection is made between the first washer 10 and the magnetic annular disk 11 as the first washer 10 is positioned in between the first nut 9 and the magnetic annular disk 11. The stopper bolt 7 is readily connected and disconnected as the magnetic annular disk 11 is magnetically coupled with the first washer 10.

In order to secure the block body 1 around a pedal and the at least one spacer 12 within the pedal-receiving slot 4, the present invention may further comprise a left clamp assembly 19 and a right clamp assembly 20, seen in FIG. 1, FIG. 2, FIG. 3, FIG. 4, FIG. 5, FIG. 8, and FIG. 9. Similar with the stopper assembly 5, the left clamp assembly 19 and the right clamp assembly 20 may each comprise a clamping plate 21, a locking bolt 22, a second bolt-receiving slot 23, a second nut 24, and a second washer 25. The clamping plate 21 connects the locking bolt 22 with the block body 1. The locking bolt 22 presses the at least one spacer 12 against the pedal. The second bolt-receiving slot 23 allows the locking bolt 22 to traverse through both the clamping plate 21 and the block body 1 in order for the clamping bolt to press against the at least one spacer 12. The second nut 24 locks the position of the locking bolt 22 within the second bolt-receiving slot 23. The second washer 25 secures the connection between the second nut 24 and the locking bolt 22. In order to ensure the at least one spacer 12 does not slip past the block body 1, the stopper assembly 5 is positioned in between the left clamp assembly 19 and the right clamp assembly 20. A foot of the user freely presses across the first flat surface 2 as the clamping plate 21 is fixed onto the second flat surface 3. The locking bolt 22 freely traverses through the clamping plate 21 and the block body 1 as the second bolt-receiving slot 23 traverses through the clamping plate 21, into the block body 1, and into the pedal-receiving slot 4. The position of the locking bolt 22 is secured within the second bolt-receiving slot 23 as the locking bolt 22 is positioned though the second nut 24 and the second washer 25 and is threadably engaged with the second nut 24. More specifically, the second washer 25 is slidably engaged along the locking bolt 22. The locking bolt 22 is connected with the clamping plate 21 as the locking bolt 22 is threadably engaged to the clamping plate 21. The second washer 25 is positioned in between the second nut 24 and the clamping plate 21, thereby reinforcing the connection first nut 9 and the clamping plate 21. The at least one spacer 12 is pressed against the pedal-receiving slot 4 by the locking bolt 22, thereby tightening the at least one spacer 12 with the pedal, and consequently the block body 1 as well. In a preferred embodiment of the present invention, a length of the stopper bolt 7 is greater than a length of the locking bolt 22.

Furthermore, the indented side 13 may comprise a first linear portion 14, a second linear portion 15, and a concave portion 16, seen in FIG. 6, FIG. 7, FIG. 8, and FIG. 9. The first linear portion 14 and the second linear portion 15 ensure a balanced and secure position for the at least one spacer 12 within the pedal-receiving slot 4. Moreover, the first linear portion 14 and the second linear portion 15 presses up within the pedal-receiving slot 4, acting as stoppers for the at least one spacer 12. The concave portion 16 provides space for the stopper bolt 7 to traverse across the at least one spacer 12 and press directly onto the pedal. The concave portion 16 is positioned in between the first linear portion 14 and the second linear portion 15, thereby centrally aligning the stopper bolt 7 with the pedal. The at least one stopper plate 6 and the pedal are evenly secured within the block body 1 as the locking bolt 22 of the left clamp assembly 19 is positioned adjacent to the first linear portion 14, and the locking bolt 22 of the right clamp assembly 20 is positioned adjacent to the second linear portion 15. More specifically, the concave portion 16 is laterally positioned about the stopper bolt 7.

Furthermore, the present invention may comprise a pedal-bracing ledge 27, which would be used with a more elongated embodiment of the at least one spacer 12. The pedal-bracing ledge 27 reinforces the grip of the at least one spacer 12 with a pedal. More specifically, the pedal-bracing ledge 27 latches into or underneath the pedal. The pedal-bracing ledge 27 accommodates the structure of the pedal and the position of the pedal within the pedal-receiving slot 4 as the pedal-bracing ledge 27 is connected onto the at least one spacer 12. Moreover, the pedal-bracing ledge 27 is positioned along the linear side 17 as to not inhibit the connection between the stopper bolt 7 with the pedal.

The preferred embodiment of the present invention further comprises a plurality of grips 26, seen in FIG. 1. The plurality of grips 26 increases the friction between the foot of the user and the block body 1. The plurality of grips 26 prevents the foot of the user from slipping past the block body 1. As the first flat surface 2 is oriented towards the foot of the user, the plurality of grips 26 is integrated across the first flat surface 2.

Although the invention has been explained in relation to its preferred embodiment, it is to be understood that many other possible modifications and variations can be made without departing from the spirit and scope of the invention as hereinafter claimed.

What is claimed is:
1. An adjustable pedal block comprises:
a block body;
a pedal-receiving slot;
a stopper assembly;
at least one spacer;
the block body comprises a first flat surface and a second flat surface;
the stopper assembly comprises a stopper plate, a stopper bolt, a first bolt-receiving slot, and a first nut;
the at least one spacer comprises an indented side and a linear side;
the first flat surface being positioned opposite the second flat surface about the block body;
the pedal-receiving slot being positioned in between the first flat surface and the second flat surface;
the pedal-receiving slot laterally traversing into the block body;
the indented side being positioned opposite the linear side about the at least one spacer;
the at least one spacer being positioned into the pedal-receiving slot;
the stopper plate being fixed onto the second flat surface;
the first bolt-receiving slot traversing through the stopper plate, into block body, and into the pedal-receiving slot;
the first nut being threadably engaged with the stopper bolt;
the stopper bolt being mounted through the first bolt-receiving slot; and,
the indented side being laterally positioned about the stopper bolt.

2. The adjustable pedal block as claimed in claim 1, wherein a surface area of the first flat surface is greater than a surface area of the second flat surface.

3. The adjustable pedal block as claimed in claim 2 comprises:
a plurality of counterforts;
the plurality of counterforts being distributed around the block body;
the plurality of counterforts being externally connected to the block body; and,
each of the plurality of counterforts tapering from the first flat surface to the second flat surface.

4. The adjustable pedal block as claimed in claim 2, wherein the block body tapers from the first flat surface to the second flat surface.

5. The adjustable pedal block as claimed in claim 1 comprises:
the stopper bolt being threadably engaged with the first bolt-receiving slot.

6. The adjustable pedal block as claimed in claim 1 comprises:
the stopper assembly further comprises a first washer and a magnetic annular disk;
the first nut being fixed onto the first washer;
the stopper bolt being positioned through the first washer;
the first washer being slidably engaged along the stopper bolt;
the magnetic annular disk being integrated into the stopper plate;
the first washer being positioned in between the first nut and the magnetic annular disk; and,
the magnetic annular disk being magnetically coupled with the first washer.

7. The adjustable pedal block as claimed in claim 1 comprises:
a left clamp assembly;
a right clamp assembly;
the left clamp assembly and the right clamp assembly each comprise a clamping plate, a locking bolt, a second bolt-receiving slot, a second nut, and a second washer;
the stopper assembly being positioned in between the left clamp assembly and the right clamp assembly;
the clamping plate being fixed onto the second flat surface;
the second bolt-receiving slot traversing through the clamping plate, into the block body, and into the pedal-receiving slot;
the locking bolt being positioned through the second nut and the second washer;
the locking bolt being threadably engaged with the second nut;
the second washer being slidably engaged along the locking bolt;
the locking bolt being threadably engaged to the clamping plate;
the second washer being positioned in between the second nut and the clamping plate; and,
the at least one spacer being pressed against the pedal-receiving slot by the locking bolt.

8. The adjustable pedal block as claimed in claim 7, wherein a length of the stopper bolt is greater than a length of the locking bolt.

9. The adjustable pedal block as claimed in claim 7 comprises:
the indented side comprises a first linear portion, a second linear portion, and a concave portion;
the concave portion being positioned in between the first linear portion and the second linear portion;
the locking bolt of the left clamp assembly being positioned adjacent to the first linear portion;
the locking bolt of the right clamp assembly being positioned adjacent to the second linear portion; and,
the concave portion being laterally positioned about the stopper bolt.

10. The adjustable pedal block as claimed in claim 1 comprises:
a pedal-bracing ledge;
the pedal-bracing ledge being connected onto the at least one spacer; and
the pedal-bracing ledge being positioned along the linear side.

11. The adjustable pedal block as claimed in claim 1 comprises:
a plurality of grips; and,
the plurality of grips being integrated across the first flat surface.

12. An adjustable pedal block comprises:
a block body;
a pedal-receiving slot;
a stopper assembly;
at least one spacer;
a left clamp assembly;
a right clamp assembly;
a pedal-bracing ledge;
the block body comprises a first flat surface and a second flat surface;
the stopper assembly comprises a stopper plate, a stopper bolt, a first bolt-receiving slot, and a first nut;
the at least one spacer comprises an indented side and a linear side;
the left clamp assembly and the right clamp assembly each comprise a clamping plate, a locking bolt, a second bolt-receiving slot, a second nut, and a second washer;
the first flat surface being positioned opposite the second flat surface about the block body;
the pedal-receiving slot being positioned in between the first flat surface and the second flat surface;
the pedal-receiving slot laterally traversing into the block body;
the indented side being positioned opposite the linear side about the at least one spacer;
the at least one spacer being positioned into the pedal-receiving slot;
the stopper plate being fixed onto the second flat surface;
the first bolt-receiving slot traversing through the stopper plate, into block body, and into the pedal-receiving slot;
the first nut being threadably engaged with the stopper bolt;
the stopper bolt being mounted through the first bolt-receiving slot;
the indented side being laterally positioned about the stopper bolt;
the stopper assembly being positioned in between the left clamp assembly and the right clamp assembly;
the clamping plate being fixed onto the second flat surface;
the second bolt-receiving slot traversing through the clamping plate, into the block body, and into the pedal-receiving slot;
the locking bolt being positioned through the second nut and the second washer;
the locking bolt being threadably engaged with the second nut;
the second washer being slidably engaged along the locking bolt;
the locking bolt being threadably engaged to the clamping plate;
the second washer being positioned in between the second nut and the clamping plate;
the at least one spacer being pressed against the pedal-receiving slot by the locking bolt;
the pedal-bracing ledge being connected onto the at least one spacer; and
the pedal-bracing ledge being positioned along the linear side.

13. The adjustable pedal block as claimed in claim 12, wherein a surface area of the first flat surface is greater than a surface area of the second flat surface.

14. The adjustable pedal block as claimed in claim 13 comprises:
a plurality of counterforts;
the plurality of counterforts being distributed around the block body;
the plurality of counterforts being externally connected to the block body; and,
each of the plurality of counterforts tapering from the first flat surface to the second flat surface.

15. The adjustable pedal block as claimed in claim 13, wherein the block body tapers from the first flat surface to the second flat surface.

16. The adjustable pedal block as claimed in claim 12 comprises:
the stopper bolt being threadably engaged with the first bolt-receiving slot.

17. The adjustable pedal block as claimed in claim 12 comprises:
the stopper assembly further comprises a first washer and a magnetic annular disk;
the first nut being fixed onto the first washer;
the stopper bolt being positioned through the first washer;
the first washer being slidably engaged along the stopper bolt;
the magnetic annular disk being integrated into the stopper plate;
the first washer being positioned in between the first nut and the magnetic annular disk; and,
the magnetic annular disk being magnetically coupled with the first washer.

18. The adjustable pedal block as claimed in claim 12, wherein a length of the stopper bolt is greater than a length of the locking bolt.

19. The adjustable pedal block as claimed in claim 12 comprises:
the indented side comprises a first linear portion, a second linear portion, and a concave portion;
the concave portion being positioned in between the first linear portion and the second linear portion;
the locking bolt of the left clamp assembly being positioned adjacent to the first linear portion;
the locking bolt of the right clamp assembly being positioned adjacent to the second linear portion; and,
the concave portion being laterally positioned about the stopper bolt.

20. The adjustable pedal block as claimed in claim 12 comprises:
    a plurality of grips; and,
    the plurality of grips being integrated across the first flat surface.

\* \* \* \* \*